US012617697B2

(12) United States Patent
Xiao et al.

(10) Patent No.: US 12,617,697 B2
(45) Date of Patent: May 5, 2026

(54) METHOD AND DEVICE FOR SEPARATION AND RECOVERY OF HEAVY METAL IONS BY MEMBRANE-FORMING MINERALIZATION FIXATION

(71) Applicants: Qingdao University of Technology, Qingdao City (CN); Qingdao OE Tiancheng Environmental Engineering Co., Ltd., Qingdao City (CN)

(72) Inventors: Liping Xiao, Qingdao City (CN); Jichi Bai, Qingdao City (CN); Yunlong Lan, Qingdao City (CN); Yue Li, Qingdao City (CN); Qiaoping Kong, Qingdao City (CN); Baohua Shen, Qingdao City (CN); Dongxue Wang, Qingdao City (CN); Zhihui Deng, Qingdao City (CN)

(73) Assignees: Qingdao University of Technology (CN); Qingdao OE Tiancheng Environmental Engineering Co., Ltd. (CN)

( * ) Notice: Subject to any disclaimer, the term of this patent is extended or adjusted under 35 U.S.C. 154(b) by 278 days.

(21) Appl. No.: 18/291,244

(22) PCT Filed: Nov. 28, 2023

(86) PCT No.: PCT/CN2023/134662
§ 371 (c)(1),
(2) Date: Dec. 10, 2025

(87) PCT Pub. No.: WO2025/015800
PCT Pub. Date: Jan. 23, 2025

(65) Prior Publication Data
US 2025/0026665 A1     Jan. 23, 2025

(30) Foreign Application Priority Data
Jul. 17, 2023     (CN) ......................... 202310878015.7

(51) Int. Cl.
*C02F 1/28*          (2023.01)
*B01J 20/02*          (2006.01)
(Continued)

(52) U.S. Cl.
CPC ............... *C02F 1/288* (2013.01); *B01J 20/02* (2013.01); *B01J 20/10* (2013.01); *B01J 20/12* (2013.01);
(Continued)

(58) Field of Classification Search
None
See application file for complete search history.

(56) References Cited

FOREIGN PATENT DOCUMENTS

| CN | 106746172 A | 5/2017 | |
| CN | 112875832 A * | 6/2021 | ............... C02F 1/66 |
| KR | 10-2006-0122228 A | 11/2006 | |

OTHER PUBLICATIONS

Bai et al. (Sci Rep 2021, 11, 23793). (Year: 2021).*
(Continued)

*Primary Examiner* — Clare M Perrin

(57)          ABSTRACT

The present invention provides a method, and device for the separation and recovery of heavy metal ions by membrane-forming mineralization fixation, which belongs to the field of acid wastewater treatment technology containing heavy metal ions, comprises the following steps: mixing the composite mineral particles with the heavy metal acidic wastewater, performing a first hydration reaction under a standing condition, and performing adsorption-precipitation-crystallization on the heavy metal ions in the heavy metal acidic wastewater by the obtained colloidal liquid membrane to obtain particles with an outer layer having a mineralized membrane; the particles having a mineralized membrane in the outer layer have a spacing between the mineralized membrane and the particles; separating the particles having
(Continued)

a mineralized membrane in the outer layer, and then respectively recovering the same; the process for the preparation method of the composite mineral particles comprises the following steps: mixing sodium carbonate/sodium silicate, bentonite, carbide slag and water, performing a second hydration reaction, and then successively performing granulation, aging, and dehydration condensation to obtain composite mineral particles; the particle size of the bentonite and carbide slag are independently $\leq 74$ μm. The present invention can realize the separation and recovery of heavy metal ions by membrane-forming mineralization fixation and waste control by waste.

9 Claims, 6 Drawing Sheets

(51) Int. Cl.

| | |
|---|---|
| *B01J 20/10* | (2006.01) |
| *B01J 20/12* | (2006.01) |
| *B01J 20/30* | (2006.01) |
| *B01J 20/34* | (2006.01) |
| *B01J 20/04* | (2006.01) |
| *B01J 20/08* | (2006.01) |
| *B01J 20/28* | (2006.01) |
| *B01J 20/32* | (2006.01) |
| *C02F 101/20* | (2006.01) |
| *C02F 103/10* | (2006.01) |

(52) U.S. Cl.
CPC ....... *B01J 20/3085* (2013.01); *B01J 20/3433* (2013.01); *B01J 20/041* (2013.01); *B01J 20/08* (2013.01); *B01J 20/28016* (2013.01); *B01J 20/3078* (2013.01); *B01J 20/3242* (2013.01); *C02F 2101/20* (2013.01); *C02F 2103/10* (2013.01); *C02F 2303/16* (2013.01)

(56) References Cited

OTHER PUBLICATIONS

Changalvaei et al. (Mater. Res. Express, 2021, 8, 055506). (Year: 2021).*
Zou et al. (Colloids and Surfaces A, 2018, 538, 825-833). (Year: 2018).*
Machine translation of CN-112875832-A, pp. 1-7. (Year: 2021).*

* cited by examiner

METHOD AND DEVICE FOR SEPARATION AND RECOVERY OF HEAVY METAL IONS BY MEMBRANE-FORMING MINERALIZATION FIXATION

This application claims priority to Chinese Patent Application No. 202310878015.7, filed on Jul. 17, 2023, and entitled 'Method and Device for Separation And Recovery Of Heavy Metal Ions By Membrane-Forming Mineralization Fixation' the entire disclosure of which is hereby incorporated by reference.

TECHNICAL FIELD

The present invention relates to the field of acid wastewater treatment technology containing heavy metal ions, in particular to a method, and device for the separation and recovery of heavy metal ions by membrane-forming mineralization fixation.

BACKGROUND ART

With the rapid development of industry, the large-scale exploitation of mineral resources has led to increasingly prominent environmental pollution problems, where, metal sulfide mines produce a large amount of acidic wastewater containing heavy metal ions in the process of mining, dressing, and smelting, as well as the discharged open-air stacked waste ore and tailings dam, these heavy metal acidic wastewater has the characteristics of a large amount of water, strong acidity (pH is 2-5), high concentration of heavy metal ions (ion content in per liter of water is from dozens to hundreds of milligrams), complex composition (containing a variety of heavy metals, such as iron, manganese, zinc, copper, plumbum, cadmium, chromium, etc.), strong toxicity, wide pollution range, long duration, and serious harm, in particular to the discharge of valuable heavy metal wastewater will also cause waste of mineral resources. Acidic wastewater containing heavy metals is discharged without timely and proper collection and treatment, which will eventually lead to heavy metal pollution of surface water, soil, crops, and groundwater, once it causes non-point source pollution, which is hard to treat, the effective treatment of heavy metal acidic wastewater is urgent and imminent.

At present, the main treatment methods of heavy metal acidic wastewater comprise neutralization, chemical precipitation, electrolytic deposition, extraction, ion exchange, membrane separation, adsorption, wetland, and microbial methods, but there are still some problems, such as low treatment efficiency, a large amount of precipitated mud (hazardous waste), difficult separation of mud and water, small capacity of adsorbent, high cost, no energy saving, complex operation and difficult recovery of heavy metal ions, in particular, the valuable metals in wastewater are valuable mineral resources and have not been effectively mineralized, fixed and recycled.

Therefore, how to treat heavy metal acidic wastewater and realize the resource utilization of industrial solid waste carbide slag, changing waste into valuables, waste control by waste, simultaneous treatment of wastewater and waste slag, mineralization fixation recovery of valuable metal resources in wastewater and circular economy have become urgent technical problems to be solved in this field.

SUMMARY

An objective of the present invention is to provide a method and device for the separation and recovery of heavy metal ions by membrane-forming mineralization fixation. The method for the separation and recovery of heavy metal ions by membrane-forming mineralization fixation can realize the purification treatment of recovery of heavy metal ions and heavy metal acidic wastewater by membrane-forming mineralization fixation and can realize the resource utilization of industrial solid waste carbide slag, changing waste into valuables, waste control by waste, simultaneous treatment of wastewater and waste slag, mineralization fixation recovery of valuable metal resources in wastewater and circular economy.

In order to achieve the above objective, the present invention provides the following technical scheme:

the present invention provides a method for the separation and recovery of heavy metal ions by membrane-forming mineralization fixation, comprising the following steps mixing the composite mineral particles with the heavy metal acidic wastewater, performing a first hydration reaction under a standing condition, and performing adsorption-precipitation-crystallization on the heavy metal ions in the heavy metal acidic wastewater by the obtained colloidal liquid membrane to obtain particles with an outer layer having a mineralized membrane; the particles having a mineralized membrane in the outer layer have a spacing between the mineralized membrane and the particles;

separating the particles having a mineralized membrane in the outer layer to obtain a mineralized membrane and particles, and then respectively recovering the same;

the process for the preparation method of the composite mineral particles comprises the following steps:

mixing sodium carbonate/sodium silicate, bentonite, carbide slag, and water, performing a second hydration reaction, and then successively performing granulation, aging, and dehydration condensation to obtain composite mineral particles;

the particle size of the bentonite and carbide slag are independently ≤74 μm.

Preferably, the dosage ratio of the composite mineral particles to the heavy metal acidic wastewater is 0.1-2.5 g:1 L.

Preferably, the mass ratio of bentonite to carbide slag is (15.5-57.5):(40-80);

the mass of the sodium carbonate/sodium silicate is 2.5-4.5 wt % of the total mass of the sodium carbonate/sodium silicate, bentonite, and carbide slag.

Preferably, according to the mass percentage, the chemical composition of the bentonite comprises: $SiO_2$:65-80%, $Al_2O_3$:11-17%, $Na_2O$:3.0-6.0%, $CaO$:2.0-3.5%, $MgO$:2.0-5.0%, $Fe_2O_3$:1.6-4.0%, $TiO_2$:0.04-0.20%, $K_2O$:0.1-1.2% and impurities: 0.10-2.16%;

the chemical composition of the carbide slag comprises: $CaO$:86.7-94.5%, $SiO_2$:2.0-6.5%, $Al_2O_3$:0.5-3.0%, $Na_2O$:0.5-2.5%, $Fe_2O_3$:0.2-1.5%, $MgO$:0.10-0.22%, $TiO_2$:0.01-0.08% and impurities: 1.0-1.72%.

Preferably, the sodium carbonate/sodium silicate, bentonite, carbide slag, and water are mixed as the first mixing of sodium carbonate/sodium silicate, bentonite and carbide slag, followed by uniformly mixing and then the water is added for the second mixing;

the total mass ratio of sodium carbonate/sodium silicate, bentonite, and carbide slag to the mass of water is 1:(0.5-0.9).

Preferably, the product's particle size obtained by the granulation is 2-7 mm.

Preferably, the aging temperature is 10-35° C., and the aging time is 2-12 h.

Preferably, the dehydration condensation is dried under natural conditions for 24-48 h;

or the temperature of the dehydration condensation is 150-450° C., and the time of dehydration condensation is 0.6-1.5 h.

Preferably, the mineralized membrane is recycled as raw material or finished product; the particles are recovered as adsorbents.

The present invention also provides a device for the separation and recovery of heavy metal ions by membrane-forming mineralization fixation, comprising a lower plate and an upper plate arranged in a stacked manner;

the upper plate is provided with a through hole.

The present invention provides a method for the separation and recovery of heavy metal ions by membrane-forming mineralization fixation, comprising the following steps: mixing the composite mineral particles with the heavy metal acidic wastewater, performing a first hydration reaction under a standing condition, and performing adsorption-precipitation-crystallization on the heavy metal ions in the heavy metal acidic wastewater by the obtained colloidal liquid membrane to obtain particles with an outer layer having a mineralized membrane; the particles having a mineralized membrane in the outer layer have a spacing between the mineralized membrane and the particles; separating the particles having a mineralized membrane in the outer layer to obtain a mineralized membrane and particles, and then respectively recovering the same; the process for the preparation method of the composite mineral particles comprises the following steps: mixing sodium carbonate/sodium silicate, bentonite, carbide slag, and water, performing a second hydration reaction, and then successively performing granulation, aging, and dehydration condensation to obtain composite mineral particles; the particle size of the bentonite and carbide slag are independently ≤74 μm. The method for the separation and recovery of heavy metal ions by membrane-forming mineralization fixation provided by the present invention can improve the adhesion and mechanical strength of the particles by adjusting the particle size of bentonite and carbide slag, mixing with sodium carbonate/sodium silicate, and forming calcium silicate hydrate (C-S-H) gel by hydration reaction under the action of water; the hydration reaction in the particles is more complete by aging the particles obtained after hydration reaction and granulation, and the water in the calcium silicate hydrate (C-S-H) gel is dried and dehydrated by dehydration condensation to condense the particles, when the composite particles after dehydration condensation are put into water during used, they absorb water and undergo hydration reaction to form calcium silicate hydrate (C-S-H) gel again, and release $Ca(OH)_2$ and the exothermic expansion occurs at the same time, so that the temperature difference and composition change occur locally in the same solution around the particles to form an interface layer, the interface energy of the system has a tendency to shrink to the minimum, so the interface is spherical, moreover, due to the high local concentration of slightly soluble $Ca(OH)_2$ and the lower solubility at high-temperature, the $Ca(OH)_2$ colloidal structure is formed to form a backbone distributed on the spherical interface and a thick water membrane is adsorbed on the surface to form a colloidal liquid membrane, the negatively charged colloidal liquid membrane rich in $Ca(OH)_2$ adsorbs heavy metal cations to form heavy metal hydroxide precipitates as the initial formation of crystal nucleus-induced crystallization, and generates basic sulfate crystals of heavy metal the continuous under acidic conditions, through adsorption-precipitation-crystallization self-growth mineralization synergy, the mineralized membrane mainly containing heavy metal basic sulfate crystals is finally formed, and the fixation mineralization recovery of heavy metal ions and the recovery of particles were realized by separating the mineralized membrane and particles and recovering them respectively. The experimental results show that the method, and device for the separation and recovery of heavy metal ions by membrane-forming mineralization fixation provided by the present invention treat the acidic wastewater with an initial pH value of 2-6 and heavy metal ion concentration of 50-500 mg/L, the effluent pH reaches 6-9, the removal rate of heavy metals reaches 95-100%, which can reach the emission standard, the recovery amount of mineralized membrane reaches 200-2000 mg/g, the purity of heavy metals in mineralized membrane reaches more than 50%, and the purity of mineralized membrane crystals reaches more than 90%, the fixation recovery effect of valuable metal mineralization is good.

DETAILED DESCRIPTION OF THE EMBODIMENTS

Figure 1:
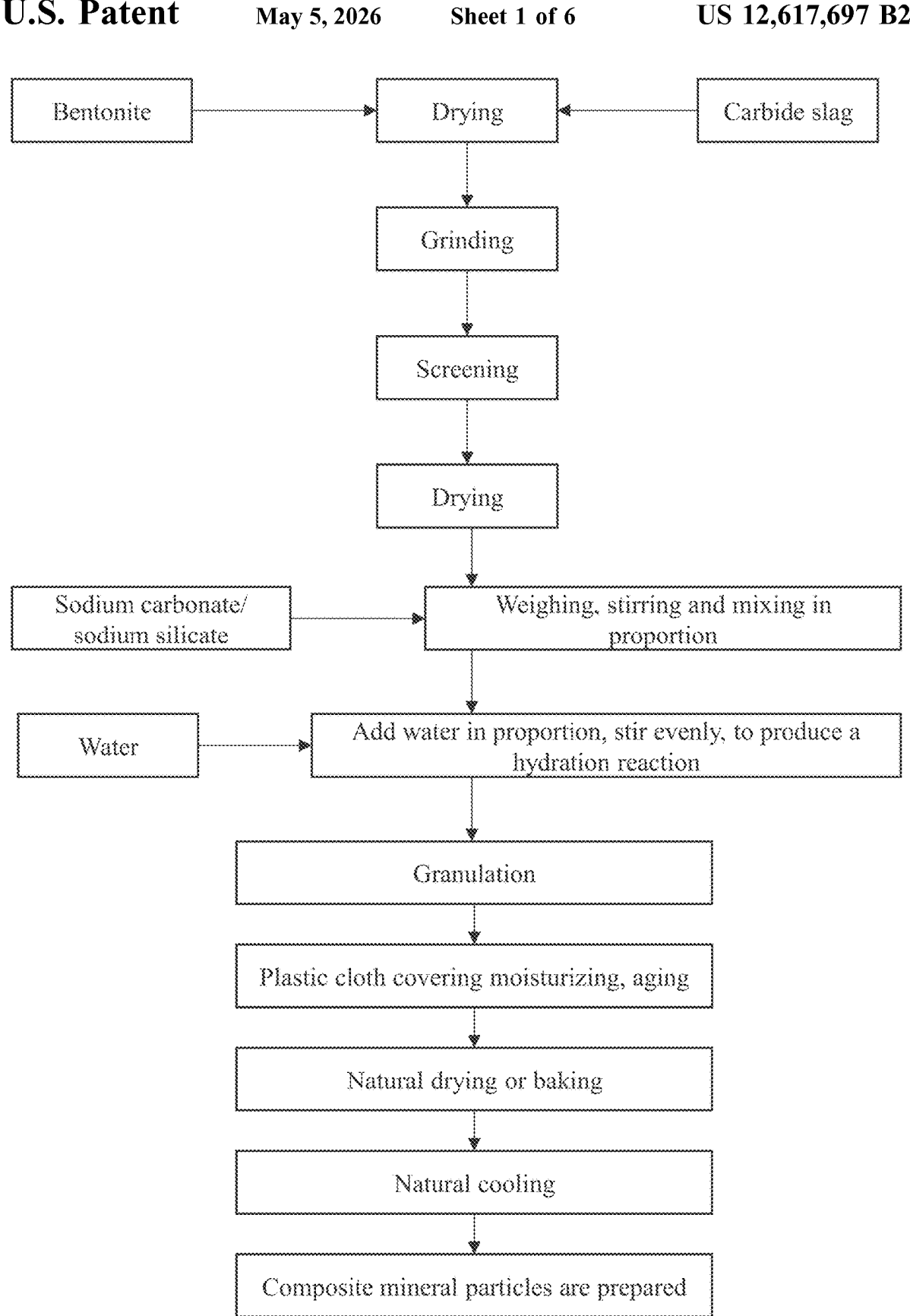
FIG. 1 is a flow diagram of the preparation process of the composite mineral particles of the present invention.

The present invention provides a method for the separation and recovery of heavy metal ions by membrane-forming mineralization fixation, comprising the following steps:

the composite mineral particles are mixed with the heavy metal acidic wastewater, a first hydration reaction is performed under a standing condition, and adsorption-precipitation-crystallization is performed on the heavy metal ions in the heavy metal acidic wastewater by the obtained colloidal liquid membrane to obtain particles with an outer layer having a mineralized membrane; the particles having a mineralized membrane in the outer layer have a spacing between the mineralized membrane and the particles;

the particles having a mineralized membrane in the outer layer are separated to obtain a mineralized membrane and particles, and then respectively recovered the same;

the process for the preparation method of the composite mineral particles comprises the following steps:

the sodium carbonate/sodium silicate, bentonite, carbide slag, and water are mixed, a second hydration reaction is performed, and then granulation, aging, and dehydration condensation are successively performed to obtain composite mineral particles;

the particle size of the bentonite and carbide slag are independently ≤74 μm.

The present invention mixes the composite mineral particles with the heavy metal acidic wastewater, a first hydration reaction is performed under a standing condition, and adsorption-precipitation-crystallization is performed on the heavy metal ions in the heavy metal acidic wastewater by the obtained colloidal liquid membrane to obtain particles with an outer layer having a mineralized membrane.

In the present invention, the heavy metal acidic wastewater is preferably heavy metal acidic wastewater with an initial pH value of 2-6 and heavy metal ion concentration of 50-500 mg/L; the present invention limits the heavy metal acidic wastewater to the above types, which can maximize the membrane-forming mineralization performance of the composite particles.

In the present invention, the process for the preparation method of the composite mineral particles comprises the following steps:

the sodium carbonate/sodium silicate, bentonite, carbide slag, and water are mixed, a second hydration reaction is performed, and then granulation, aging, and dehydration condensation are successively performed to obtain composite mineral particles.

In the present invention, the particle size of the bentonite and carbide slag are independently ≤74 μm. The present invention limits the particle size of bentonite and carbide slag to the above range, which can facilitate the subsequent hydration reaction, further promote the composite particles to form a colloidal liquid membrane in acidic wastewater, and membrane-forming mineralization fixation to recover heavy metal ions, the particle size of bentonite and carbide slag exceeds the above range, which will make the prepared composite particles unable to membrane-forming mineralization fixation to recover heavy metal ions in acidic wastewater.

In the present invention, when the particle size of the bentonite and carbide slag does not meet the above requirements, the bentonite and carbide slag is preferably pretreated separately; the pretreatment preferably comprises drying, grinding, and screening in turn. The present invention has no special limitation on the operation of drying, grinding, and screening, and adopts the operation commonly used by technicians in this field to make the particle size of bentonite and carbide slag meet ≤74 μm.

In the present invention, the bentonite and carbide slag are preferably dried before use; the drying is preferably carried out in an oven; the drying temperature is preferably 100-110° C., and more preferably 105° C.; the drying time is preferably 2-4 h. The present invention has no special limitation on the model for the oven, and the oven commonly used in this field can be used. The present invention limits the temperature and time of drying to the above range so that bentonite and carbide slag can be fully dried.

In the present invention, according to the mass percentage, the chemical composition of the bentonite comprises: $SiO_2$:65-80%, $Al_2O_3$:11-17%, $Na_2O$:3.0-6.0%, $CaO$:2.0-3.5%, $MgO$:2.0-5.0%, $Fe_2O_3$:1.6-4.0%, $TiO_2$:0.04-0.20%, $K_2O$:0.1-1.2% and impurities: 0.10-2.16%, and more preferably: $SiO_2$:73.33%, $Al_2O_3$:13.55%, $Na_2O$:4.25%, $CaO$: 2.24%, $MgO$:3.59%, $Fe_2O_3$:2.26%, $TiO_2$:0.12%, $K_2O$:0.50% and impurity: 0.16%. The present invention limits the chemical composition of bentonite to the above range, which is more conducive to the membrane-forming of subsequent composite particles, and then fixes and recycles heavy metal ions.

In the present invention, the chemical composition of the carbide slag comprises: $CaO$:86.7-94.5%, $SiO_2$:2.0-6.5%, $Al_2O_3$:0.5-3.0%, $Na_2O$:0.5-2.5%, $Fe_2O_3$:0.2-1.5%, $MgO$: 0.10-0.22%, $TiO_2$:0.01-0.08% and impurities: 1.0-1.72%, and more preferably: $CaO$:93.65%, $SiO_2$:2.97%, $Al_2O_3$: 0.82%, $Na_2O$:0.71%, $Fe_2O_3$:0.22%, $MgO$:0.15%, $TiO_2$: 0.06% and impurities: 1.42%. The present invention limits the chemical composition of carbide slag to the above range, which is more conducive to the membrane-forming of subsequent composite particles, and then fixes and recycles heavy metal ions.

In the present invention, the mass ratio of bentonite to carbide slag is preferably (15.5-57.5):(40-80), and more preferably is (16-30):(60-80); and further preferred is (16-26.5):(70-80). The present invention limits the mass ratio of bentonite and carbide slag to the above range, which can improve the membrane-forming mineralization fixation recovery ability of composite particles to heavy metal ions.

In the present invention, the mass of the sodium carbonate/sodium silicate is preferably 2.5-4.5 wt % of the total mass of the sodium carbonate/sodium silicate, bentonite, and carbide slag, and more preferably is 3.7-4.2%, and further preferred is 4%. The present invention limits the addition amount of sodium carbonate/sodium silicate to the above range, which can fully stimulate the occurrence of hydration reaction, and will not cause waste of raw materials and save resources.

In the present invention, the total mass ratio of sodium carbonate/sodium silicate, bentonite, and carbide slag to water is preferably 1:(0.5-0.9), and more preferably 1:(0.7-0.9). The present invention limits the total mass ratio of sodium carbonate/sodium silicate, bentonite, and carbide slag to the mass ratio of water to the above range, which can facilitate the hydration reaction.

In the present invention, the mix is preferably to mix sodium carbonate/sodium silicate, bentonite, and carbide slag first and then add water for the second mixing. The present invention has no special limitation on the specific operation of the first mixing and can mix sodium carbonate/sodium silicate, bentonite, and carbide slag evenly. The present invention limits the mixing of sodium carbonate/sodium silicate, bentonite, and carbide slag with water to the above order, which can facilitate the hydration reaction.

In the present invention, the mixing of sodium carbonate/sodium silicate, bentonite, and carbide slag is preferably carried out in a mechanical mixer. The present invention has no special limitation on the model of the mechanical mixer, and the model known to the technicians in this field can be used. The present invention has no special limitation on the mixing temperature and time of sodium carbonate/sodium silicate, bentonite, and carbide slag, and can mix sodium carbonate/sodium silicate, bentonite, and carbide slag evenly.

In the present invention, the second mixing is preferably carried out in a mechanical mixer; the second mixing time is preferably 10-20 min, and more preferably 15 min. The present invention has no special limitation on the model of the mechanical mixer, and the model known to the technicians in this field can be used. The present invention can make the hydration reaction more sufficient through the second mixing.

The present invention mixes bentonite, calcium carbide slag, and activator, and undergoes a hydration reaction under the action of water to form a large amount of calcium silicate hydrate (C-S-H) gel, which can not only improve the adhesion and mechanical strength of the particles, but also facilitate the subsequent dehydration and condensation of the composite particles to form a large amount of amorphous calcium silicate $3CaO \cdot SiO_2$, or $2CaO \cdot SiO_2$, which is conducive to the first hydration reaction with the water sample, the specific reaction in the second hydration reaction process is as follows:

$$Na_2CO_3 + Ca(OH)_2 = 2NaOH + CaCO_3 \downarrow$$

$$2NaOH + SiO_2 = Na_2SiO_3 + H_2O$$

$$Na_2SiO_3 + Ca(OH)_2 + nH_2O = 2NaOH + CaSiO_3 \cdot nH_2O(C\text{-}S\text{-}H)$$

In the present invention, the product's particle size obtained by granulation is preferably 2-7 mm and more preferably 2-5 mm. The present invention has no special limitation on the setting of the process parameters of the granulation, and the particle size that meets the requirements can be obtained by using the parameter settings familiar to the technicians in this field. The present invention limits the product's particle size obtained by granulation to the above range, which can improve the effect of the composite particles on the membrane-forming mineralization fixation recovery of heavy metal ions. In the present invention, the granulation is preferably carried out in a molding granulator.

In the present invention, the aging temperature is preferably 10-35° C., and the aging time is preferably 2-12 h. The present invention sets the aging temperature to the above range, which can make the hydration reaction more sufficient. The present invention can make the composite particles form a colloidal liquid membrane in the acidic wastewater through the aging process, and the membrane-forming mineralization fixation to recover the heavy metal ions under acidic conditions.

The present invention preferably covers the granulated product with a plastic cloth during aging. The present invention can avoid the loss of water in the aging process and ensure the amount of water required for the hydration reaction by covering.

In the present invention, the dehydration condensation is preferably dried under natural conditions for 24-48 h; or the temperature of the dehydration condensation is preferably 150-450° C., and more preferably 220-450° C.; and the time of dehydration condensation is preferably 0.6-1.5 h. The present invention sets the temperature and time of dehydration condensation to the above range, which can fully dry and dehydrate the composite particles, which is conducive to the subsequent membrane-forming mineralization fixation recovery of heavy metal ions in acidic wastewater. The present invention can make the composite particles hydrate in the acidic wastewater to form a colloidal liquid membrane by dehydration condensation, and the membrane-forming mineralization fixation to recover heavy metal ions.

When the temperature of the dehydration condensation is 150-450° C., the present invention preferably performs a temperature reduction treatment on the product after the dehydration condensation; the temperature reduction treatment is preferably natural cooling. The present invention may facilitate the preservation of the composite particles by the temperature reduction treatment.

In an example of the present invention, as shown in FIG. 1, the process flow for the preparation of the composite mineral particles is:

the bentonite and carbide slag were grinded, sieved, and dried in turn, and then weighed, stirred, and mixed with sodium carbonate/sodium silicate in proportion, then water was added in proportion and stirred evenly to produce a hydration reaction, after that, granulation, plastic cloth covering moisturizing, aging, natural drying or baking were carried out in turn, finally, composite mineral particles were prepared after natural cooling.

In the present invention, the dosage ratio of the composite mineral particles to the heavy metal acidic wastewater is preferably 0.1-2.5 g:1 L; more preferably 0.5-1.5 g:1 L. The present invention defines the dosage ratio of the composite mineral particles to the heavy metal acidic wastewater in the above-mentioned range to better perform the membrane-forming mineralization fixation of the heavy metal ions in the wastewater.

In the present invention, the reaction of the first hydration reaction is preferable that when the composite mineral particles are mixed with the wastewater, they absorb water and undergo a hydration reaction to form calcium silicate hydrate (C-S-H) gel, and release $Ca(OH)_2$ and the exothermic expansion occurs at the same time so that the temperature difference and composition change occur locally in the same solution around the particles to form an interface layer, the interface energy of the system has a tendency to shrink to the minimum, so the interface is spherical, moreover, due to the high local concentration of slightly soluble $Ca(OH)_2$ and the lower solubility at high temperature, the $Ca(OH)_2$ colloidal structure is formed to form a backbone distributed on the spherical interface and a thick water membrane is adsorbed on the surface to form a negatively charged colloidal liquid membrane rich in $Ca(OH)_2$.

The present invention can facilitate the formation of a colloidal liquid membrane under stable conditions by performing the first hydration reaction under static conditions, facilitate the self-growth of crystals on the surface of the colloidal liquid membrane to form a mineralized membrane and facilitate the separation and recovery of particles and mineralized membranes after subsequent reactions.

In the present invention, the adsorption process is preferred to be that the negatively charged colloidal liquid membrane rich in $Ca(OH)_2$ adsorbs heavy metal ions to form heavy metal hydroxide precipitates, the hydroxide precipitates as the initial formation of crystal nucleus-induced crystallization, and generates basic sulfate crystals of heavy metal under acidic conditions, continue to adsorption-precipitation-crystallization self-growth mineralization, the mineralized membrane mainly containing heavy metal basic sulfate crystals is finally formed, the present invention realizes the membrane-forming mineralization fixation of heavy metal ions through the synergistic effect of adsorption-precipitation-crystal nucleus-induced crystallization self-growth mineralization.

In the present invention, the particles having a mineralized membrane in the outer layer have a spacing between the mineralized membrane and the particles.

After obtaining particles with an outer layer having a mineralized membrane; the present invention separates the particles with a mineralized membrane in the outer layer to obtain a mineralized membrane and particles, and then respectively recovered the same.

In the present invention, the particles are preferably composite mineral particles that release $Ca(OH)_2$ through a hydration reaction and then have a loose porous structure.

In the present invention, the mineralized membrane is preferably recycled as a raw material or finished product; the particles are preferably recovered as adsorbents. The present invention can realize no waste discharge, green, environmental protection, and circular economy via recycling mineralized membranes and particles respectively.

In the present invention, the mineralized membrane is preferably recycled as raw material or finished product, and is more preferably recycled as raw material of heavy metal salt, raw material of heavy metal oxide, raw material of smelting heavy metal, broad-spectrum inorganic heavy metal salt protective algae-killing fungicide, trace element fertilizer, flocculant or pigment.

The present invention preferably recycles the dried particles as an adsorbent; the adsorbent is preferably used to adsorb heavy metal ions in low-concentration heavy metal acidic wastewater.

In the present invention, when the adsorbent adsorbs the heavy metal ions in the low-concentration heavy metal acidic wastewater to reach saturation, the adsorbent after adsorption saturation is preferably dried and recycled as a metal mineral resource.

In the present invention, the drying is preferably dried under natural conditions for 24-48 h or high-temperature drying; the high-temperature drying is preferably carried out in an oven; the high-temperature drying temperature is preferably 105° C., and the high-temperature drying time is preferably 1-2 h. The present invention has no special limitation on the model of the oven, and the oven commonly used in this field can be used. The present invention limits the drying temperature and time to the above range so that the recovered composite mineral particles can be fully dried.

The present invention collects and dries the particles as an adsorbent for the adsorption of heavy metal ions until the adsorption of heavy metal ions is saturated and recycled as a metal mineral resource. The present invention utilizes the characteristics of larger particle porosity and larger specific surface area obtained after hydration reaction, which is more conducive to being used as an adsorbent and easy to recycle and has no waste discharge, green, environmental protection, and can realize circular economy.

The method for the separation and recovery of heavy metal ions by membrane-forming mineralization fixation provided by the present invention can improve the adhesion and mechanical strength of the particles by adjusting the particle size of bentonite and carbide slag, mixing with sodium carbonate/sodium silicate, and forming calcium silicate hydrate (C-S-H) gel by hydration reaction under the action of water; the hydration reaction in the particles is more complete by aging the particles obtained after hydration reaction and granulation, and the water in the calcium silicate hydrate (C-S-H) gel is dried and dehydrated by dehydration condensation to condense the particles, when the composite particles after dehydration condensation are put into water during used, they absorb water and undergo hydration reaction to form calcium silicate hydrate (C-S-H) gel again, and release $Ca(OH)_2$ and the exothermic expansion occurs at the same time, so that the temperature difference and composition change occur locally in the wastewater around to form a spherical interface layer rich in $Ca(OH)_2$ colloidal structure, and a thick water membrane is adsorbed on the surface to form a colloidal liquid membrane, the negatively charged colloidal liquid membrane rich in $Ca(OH)_2$ adsorbs heavy metal cations to form heavy metal hydroxide precipitates as the initial formation of crystal nucleus-induced crystallization, and generates basic sulfate crystals of heavy metal under acidic conditions, through the continuous adsorption-precipitation-crystallization self-growth mineralization synergy, the mineralized membrane mainly containing heavy metal basic sulfate crystals is finally formed, and the fixation mineralization recovery of heavy metal ions was realized by separating the mineralized membrane and particles.

The present invention also provides a device for the separation and recovery of heavy metal ions by membrane-forming mineralization fixation, comprising a lower plate and an upper plate arranged in a stacked manner; the upper plate is provided with a through hole.

In the present invention, the upper plate is provided with a through hole; the diameter of the through hole is preferably 2-3 mm larger than the length of the composite mineral particles, and the center distance of the wo adjacent through hole is preferably 2-4 times the diameter of the through hole, and the depth of the through hole is preferably 1-2 mm. In the present invention, the through-hole parameters on the upper plate are limited to the above range can be more conducive to the growth of mineralized membrane on the upper plate and more convenient for the separation and recovery of subsequent particles and mineralized membrane.

In the present invention, an edge of the lower plate is preferably provided with a vertical cardboard. The present invention arranged a vertical cardboard on the lower plate to fix the upper plate and the lower plate, so as to ensure that the upper plate and the lower plate will not slide during the mineralization of heavy metal ions, which is beneficial to the membrane-forming mineralization on the outer layer of composite mineral particles.

In the present invention, the length of the vertical cardboard is preferably 5 cm, the width is preferably 1 cm, and the height is preferably 5 mm larger than the sum of the thickness of the upper plate and the lower plate. The present invention has no special requirement for the number of vertical cardboards and can ensure that the upper plate and the lower plate can be fixed firmly during use and that the upper plate and the lower plate do not slide. The present invention arranged a vertical cardboard on the lower plate to fix the upper plate and the lower plate, so as to ensure that the upper plate and the lower plate will not slide during the mineralization of heavy metal ions, which is beneficial to the membrane-forming mineralization on the outer layer of composite mineral particles.

The present invention sets the vertical cardboard as the above size, which can fix the upper plate and the lower plate during the membrane-forming mineralization process of heavy metal ions, avoid the sliding of the upper plate and the lower plate, and is more conducive to the growth of the mineralized membrane, after the membrane-forming mineralization process of heavy metal ion, it is beneficial to the separation of the upper plate and the lower plate, which is beneficial to the separation and recovery of composite mineral particles and mineralized membrane.

In the present invention, the material of the upper plate, the lower plate, and the vertical cardboard is preferably an organic plastic template. The present invention can avoid the corrosion of the device in acidic wastewater by setting the upper plate, the lower plate, and the vertical cardboard as the above materials.

When the device described in the invention is used for the separation and recovery of heavy metal ions by membrane-forming mineralization fixation, the composite mineral particles are uniformly dispersed on the device for the separation and recovery of heavy metal ions by membrane-forming mineralization fixation, and the device is placed in heavy metal acidic wastewater. Under the static condition, the first hydration reaction of the composite mineral particles forms a colloidal liquid film on the upper plate around the composite mineral particles. Through the adsorption-precipitation-crystallization self-growth mineralization of heavy metal ions, a mineralized membrane is formed on the upper plate around the particles; after the mineralization of heavy metal ions, the purified heavy metal acidic wastewater is discharged, and the upper plate with the growth of the mineralized membrane is lifted out. The mineralized membrane is left on the upper plate, and the particles are left on the lower plate to complete the separation of the mineralized membrane and the particles. Then the mineralized membrane on the upper plate is gently scraped off to collect and recover, and the particles left on the lower plate are collected and dried as by-products. The present invention can better separate the mineralized membrane from the particles through the device so that the mineralized membrane and the particles can be recycled respectively.

Figure 9:
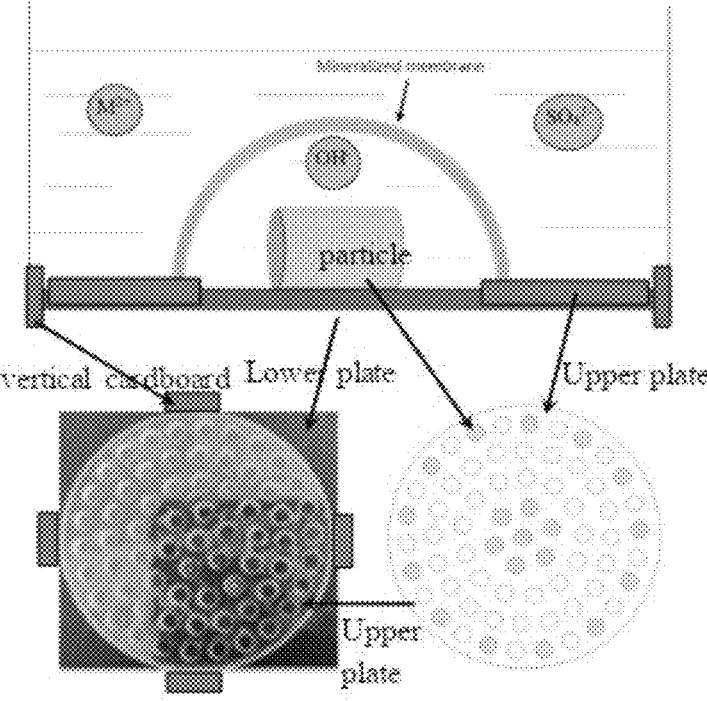
FIG. 9 is a schematic diagram of the device for the separation and recovery of heavy metal ions by membrane-forming mineralization fixation of the present invention.

In the example of the present invention, as shown in FIG. 9, the device for the separation and recovery of heavy metal ions by membrane-forming mineralization fixation comprises a lower plate, an upper plate, and a vertical cardboard that fixes the lower plate and the upper plate.

The present invention can better separate the particles with a mineralized membrane on the outer layer by using the device for the separation and recovery of heavy metal ions by membrane-forming mineralization fixation as shown in FIG. 9, which can improve the efficiency of recovery and improve the recovery and utilization rate of heavy metals in heavy metal wastewater.

The following will combine the examples in the present invention to clearly and completely describe the technical scheme in the present invention. Obviously, the described examples are only part of the examples of the present invention, not all of the examples. Based on the examples in the present invention, all other examples obtained by ordinary technicians in this field without making creative labor belong to the scope of protection of the present invention.

Example 1

A method for the separation and recovery of heavy metal ions by membrane-forming mineralization fixation, which comprises the following steps:

the 0.5 g composite mineral particles were evenly dispersed on the device for the separation and recovery of heavy metal ions, and the device was placed in 1 L of heavy metal acidic wastewater with an initial pH of 5.0 and a heavy metal ion $Cu^{2+}$ concentration of 500 mg/L, the first hydration reaction of the wastewater was carried out under static conditions to obtain a colloidal liquid membrane, and then the heavy metal ions were performed adsorption-precipitation-crystallization, through the adsorption-precipitation-crystallization self-growth mineralization synergy, the particles with an outer layer having a mineralized membrane were obtained; the particles having a mineralized membrane in the outer layer have a spacing between the mineralized membrane and the particles;

the process for the preparation method of the composite mineral particles comprises the following steps:

bentonite and carbide slag were dried in an oven at 105° C. for 3 hours, and then mixed with sodium carbonate in a mechanical mixer, after the second hydration reaction was carried out by adding water for 15 minutes, the particles with a diameter of 2 mm and a length of 3 mm were prepared by a granulator, the particles obtained by granulation were covered with plastic cloth, and aged at 20° C. for 10 hours, and then dried under natural conditions for 24 hours for dehydration and condensation to obtain composite mineral particles; the particle sizes of bentonite and carbide slag are independently ≤74 μm; the mass ratio of bentonite to carbide slag is 16.0:80; the mass of sodium carbonate accounts for 4.0% of the total mass of bentonite, carbide slag and sodium carbonate; the total mass ratio of bentonite, carbide slag and sodium carbonate to water is 1:0.9; the chemical composition of bentonite is as follows: CaO:2.24%, $SiO_2$:73.33%, $Al_2O_3$:13.55%, $Na_2O$:4.25%, $Fe_2O_3$:2.26%, MgO:3.59%, $TiO_2$:0.12%, $K_2O$:0.50%, impurity: 0.16%; the chemical composition of carbide slag is as follows: CaO:93.65%, $SiO_2$: 2.97%, $Al_2O_3$:0.82%, $Na_2O$:0.71%, $Fe_2O_3$:0.22%, MgO:0.15%, $TiO_2$:0.06%, impurity: 1.42%;

the device for the separation and recovery of heavy metal ions by membrane-forming mineralization fixation, comprising a lower plate and an upper plate arranged in a stacked manner;

the upper plate is provided with a through hole;

the edge of the lower plate is provided with a vertical cardboard, and the upper plate and the lower plate are fixed by the vertical cardboard;

the diameter of the through hole of the upper plate is 6 mm and the depth is 1 mm, the diameter of the through hole is 2 mm larger than the length of the composite mineral particles, and the distance between two adjacent through holes is 4 times the diameter of the through hole; the length of the vertical cardboard is 5 cm, the width is 1 cm, and the height is 5 mm larger than the sum of the thickness of the upper plate and the lower plate;

after the particles with an outer layer having a mineralized membrane were obtained, the purified heavy metal acidic wastewater is discharged, and the upper plate with a mineralized membrane is lifted, the mineralized membrane is left on the upper plate, and the particles are left on the lower plate to complete the separation of the mineralized membrane and the particles; the mineralized membrane on the upper plate is gently scraped off to collect and recycle, the particles left on the lower plate are collected as by-products and recovered after natural drying for 48 h, the recovered particles can be reused as an adsorbent for adsorbing heavy metal ions to recycle, and the recovered particles can continue to be recycled as a metal mineral resource after being saturated with the adsorbed heavy metal ions, so as to realize non-waste, green, and circular economy.

The pH of the effluent of the heavy metal acidic wastewater treated by the method for the separation and recovery of heavy metal ions by membrane-forming mineralization fixation provided by the present invention can reach 6.8, and the effluent $Cu^{2+}$ can reach 1 mg/L, reaching the discharge standard, the removal rate of heavy metals is 99.8%, and the recovery amount of mineralized membrane is 998 mg/g, the purity of heavy metals in the mineralized membrane reaches 52%, and the crystal purity of the mineralized membrane reaches more than 90%, the valuable metal membrane-forming mineralization fixation recovery effect is good.

Example 2

A method for the separation and recovery of heavy metal ions by membrane-forming mineralization fixation, which comprises the following steps:

the 1 g composite mineral particles were evenly dispersed on the device for the separation and recovery of heavy metal ions, and the device was placed in 1 L of heavy metal acidic wastewater with an initial pH of 3.2 and a heavy metal ion $Zn^{2+}$ concentration of 300 mg/L, the first hydration reaction of the wastewater was carried out under static conditions to obtain a colloidal liquid membrane, and then the heavy metal ions were performed adsorption-precipitation-crystallization, through the adsorption-precipitation-crystallization self-growth mineralization synergy, the particles with an outer layer having a mineralized membrane were obtained; the particles having a mineralized membrane in the outer layer have a spacing between the mineralized membrane and the particles;

the process for the preparation method of the composite mineral particles comprises the following steps:

bentonite and carbide slag were dried in an oven at 105° C. for 3 hours, and then mixed with sodium carbonate in a mechanical mixer, after the second hydration reaction was carried out by adding water for 15 minutes, the particles with a diameter of 2 mm and a length of 3 mm were prepared by a granulator, the particles obtained by granulation were covered with plastic cloth, and aged at 20° C. for 10 hours, then it was baked at 220° C. for 1.0 h for dehydration condensation, and then the composite mineral particles were obtained after natural cooling; the particle sizes of bentonite and carbide slag are independently ≤74 μm; the mass ratio of bentonite to carbide slag is 16.5:80; the mass of sodium carbonate accounts for 3.5% of the total mass of bentonite, carbide slag and sodium carbonate; the total mass ratio of sodium carbonate, bentonite and carbide slag to water is 1:0.8; the chemical composition of bentonite is as follows: Ca0:2.24%, $SiO_2$:73.33%, $Al_2O_3$:13.55%, $Na_2O$:4.25%, $Fe_2O_3$:2.26%, MgO: 3.59%, $TiO_2$:0.12%, $K_2O$:0.50%, impurity: 0.16%; the chemical composition of carbide slag is as follows: Ca0:93.65%, $SiO_2$:2.97%, $Al_2O_3$:0.82%, $Na_2O$:0.71%, $Fe_2O_3$:0.22%, Mg0:0.15%, $TiO_2$:0.06%, impurity: 1.42%;

the device for the separation and recovery of heavy metal ions by membrane-forming mineralization fixation, comprising a lower plate and an upper plate arranged in a stacked manner;

the upper plate is provided with a through hole;

the edge of the lower plate is provided with a vertical cardboard, and the upper plate and the lower plate are fixed by the vertical cardboard;

the diameter of the through hole of the upper plate is 5 mm and the depth is 1 mm, the diameter of the through hole is 2 mm larger than the length of the composite mineral particles, and the center distance between two adjacent through holes is 3 times the diameter of the through hole; the length of the vertical cardboard is 5 cm, the width is 1 cm, and the height is 5 mm larger than the sum of the thickness of the upper plate and the lower plate;

after the particles with an outer layer having a mineralized membrane were obtained, the purified heavy metal acidic wastewater is discharged, and the upper plate with a mineralized membrane is lifted, the mineralized membrane is left on the upper plate, and the particles are left on the lower plate to complete the separation of the mineralized membrane and the particles; the mineralized membrane on the upper plate is gently scraped off to collect and recycle, the particles left on the lower plate are collected as by-products and recovered after natural drying for 48 h, the recovered particles can be reused as an adsorbent for adsorbing heavy metal ions to recycle, and the recovered particles can continue to be recycled as a metal mineral resource after being saturated with the adsorbed heavy metal ions, so as to realize non-waste, green, and circular economy.

The pH of the effluent of the heavy metal acidic wastewater treated by the method for the separation and recovery of heavy metal ions by membrane-forming mineralization fixation provided by the present invention can reach 6.7, and the effluent $Zn^{2+}$ can reach 1.0 mg/L, reaching the discharge standard, the removal rate of heavy metals is 99.7%, and the recovery amount of mineralized membrane is 299 mg/g, the purity of heavy metals in the mineralized membrane reaches 50%, and the crystal purity of the mineralized membrane reaches more than 90%, the valuable metal membrane-forming mineralization fixation recovery effect is good.

Example 3

A method for the separation and recovery of heavy metal ions by membrane-forming mineralization fixation, which comprises the following steps:

the 1 g composite mineral particles were evenly dispersed on the device for the separation and recovery of heavy metal ions, and the device was placed in 1 L of heavy metal acidic wastewater with an initial pH of 3.2 and a heavy metal ion $Cu^{2+}$ concentration of 300 mg/L, the first hydration reaction of the wastewater was carried out under static conditions to obtain a colloidal liquid membrane, and then the heavy metal ions were performed adsorption-precipitation-crystallization, through the adsorption-precipitation-crystallization self-growth mineralization synergy, the particles with an outer layer having a mineralized membrane were obtained; the particles having a mineralized membrane in the outer layer have a spacing between the mineralized membrane and the particles;

the process for the preparation method of the composite mineral particles comprises the following steps:

bentonite and carbide slag were dried in an oven at 105° C. for 3 hours, and then mixed with sodium carbonate in a mechanical mixer, after the second hydration reaction was carried out by adding water for 15 minutes, the particles with a diameter of 2 mm and a length of 3 mm were prepared by a granulator, the particles obtained by granulation were covered with plastic cloth, and aged at 25° C. for 6 hours, then it was baked at 400° C. for 1.0 h for dehydration condensation, and then the composite mineral particles were obtained after natural cooling; the particle sizes of bentonite and carbide slag are independently ≤74 μm; the mass ratio of bentonite to carbide slag is 25.5:70; the mass of sodium carbonate accounts for 4.5% of the total mass of bentonite, carbide slag and sodium carbonate; the total mass ratio of bentonite, carbide slag and sodium carbonate to water is 1:0.7; the chemical composition of bentonite is as follows: Ca0:2.24%, $SiO_2$:73.33%, $Al_2O_3$:13.55%, $Na_2O$:4.25%, $Fe_2O_3$:2.26%, MgO: 3.59%, $TiO_2$:0.12%, $K_2O$:0.50%, impurity: 0.16%; the chemical composition of carbide slag is as follows: Ca0:93.65%, $SiO_2$:2.97%, $Al_2O_3$:0.82%, $Na_2O$:0.71%, $Fe_2O_3$:0.22%, Mg0:0.15%, $TiO_2$:0.06%, impurity: 1.42%;

the device for the separation and recovery of heavy metal ions by membrane-forming mineralization fixation, comprising a lower plate and an upper plate arranged in a stacked manner;

the upper plate is provided with a through hole;

the edge of the lower plate is provided with a vertical cardboard, and the upper plate and the lower plate are fixed by the vertical cardboard;

the diameter of the through hole of the upper plate is 6 mm and the depth is 1 mm, the diameter of the through hole is 3 mm larger than the length of the composite mineral particles, and the center distance of two adjacent through holes is 3 times the diameter of the through hole; the length of the vertical cardboard is 5 cm, the width is 1 cm, and the height is 5 mm larger than the sum of the thickness of the upper plate and the lower plate;

after the particles with an outer layer having a mineralized membrane were obtained, the purified heavy metal acidic wastewater is discharged, and the upper plate with a mineralized membrane is lifted, the mineralized membrane is left on the upper plate, and the particles are left on the lower plate to complete the separation of the mineralized membrane and the particles; the mineralized membrane on the upper plate is gently scraped off to collect and recycle, the particles left on the lower plate are collected as by-products and recovered after natural drying for 48 h, the recovered particles can be reused as an adsorbent for adsorbing heavy metal ions to recycle, and the recovered particles can continue to be recycled as a metal mineral resource after being saturated with the adsorbed heavy metal ions, so as to realize non-waste, green, and circular economy.

The pH of the effluent of the heavy metal acidic wastewater treated by the method for the separation and recovery of heavy metal ions by membrane-forming mineralization fixation provided by the present invention can reach 7.3, and the effluent $Cu^{2+}$ can reach 0.3 mg/L, reaching the discharge standard, the removal rate of heavy metals is 99.9%, and the recovery amount of mineralized membrane is 299.7 mg/g, the purity of heavy metals in the mineralized membrane reaches 55.86%, and the crystal purity of the mineralized membrane reaches more than 90%, the valuable metal membrane-forming mineralization fixation recovery effect is good.

Example 4 the difference from example 3 is that the carbide slag used is not dried, and the moisture content is controlled at 50-70%, the rest of the content is consistent with example 3.

Compared with the example 3, the use of carbide slag with high moisture content caused the heat released by carbide slag in the initial stage not to be utilized, which was not conducive to the hydration reaction with bentonite to form calcium silicate hydrate (C-S-H) gel.

Comparative Example 1 the difference from example 3 is that the bentonite and carbide slag are dried in an oven at 105° C. for 3 hours and then mixed with sodium carbonate in a mechanical mixer to make a mixture A, the mixture A is extruded and crushed to make a mixed particle B, the mixed particle B is directly baked at 400° C. for 1.0 h without aging, and the rest of the content is consistent with example 3.

Compared with the example 3, due to the crushing effect, it is easy to cause loosening and cracking inside the mixed particle B, which affects the adhesion of the particles and cannot be well formed, and the mixed particle B is not aged, the hydration reaction is not sufficient, and the calcium silicate hydrate (C-S-H) gel cannot be well formed, and it is not conducive to particle bonding.

Comparative Example 2 the difference from example 3 is that the carbide slag used is not dried, the moisture content is controlled at 50-70%, the bentonite and carbide slag are dried in the oven at 105° C. for 3 hours, and then mixed with sodium carbonate in the mechanical mixer to make mixture A, the mixture A is extruded and crushed to make a mixed particle B, the mixed particle B is directly baked at 400° C. for 1.0 h without aging, and the rest of the content is consistent with example 3.

Compared with the example 3, the use of carbide slag with high water content caused the heat released by carbide slag in the initial stage not to be utilized, which was not conducive to the hydration reaction with bentonite to form calcium silicate hydrate (C-S-H) gel, etc. Meanwhile, due to the crushing effect, the mixed particles B appeared loose and cracked inside, which affected the adhesion of the particles and could not be well formed, and the mixed particles B were not aged, the hydration reaction was not sufficient, and the calcium silicate hydrate (C-S-H) gel could not be well formed; only a small amount of amorphous tricalcium silicate $3CaO \cdot SiO_2$ or dicalcium silicate $2CaO \cdot SiO_2$ is formed after dehydration and condensation due to the small amount of calcium silicate hydrate (C-S-H) gel of the composite particle, when the composite particles after dehydration and condensation are used, the hydration reaction is not obvious when they are put into water, the amount of calcium silicate hydrate (C-S-H) gel is small again, and the local exothermic expansion cannot occur, the spherical colloidal liquid membrane rich in $Ca(OH)_2$ colloidal structure cannot be formed around the particles, and the mineralized membrane of heavy metal basic sulfate crystals cannot be induced to crystallize, but only $Cu(OH)_2$ precipitate is formed in the water sample around the particles.

Figure 2:
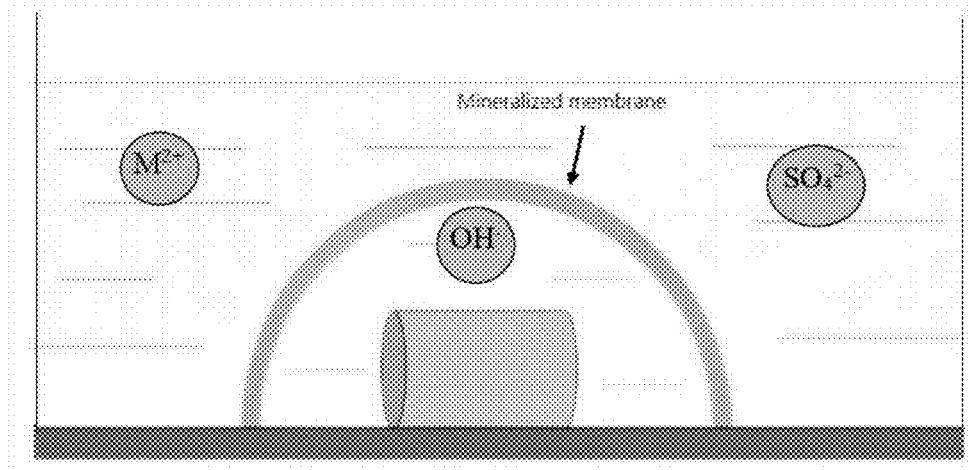
FIG. 2 is a schematic diagram of the mineralized membrane formed by the composite mineral particles of the present invention.

FIG. 2 is a schematic diagram of the mineralized membrane formed by the composite mineral particles, it can be seen from FIG. 2 that a spherical mineralized membrane is formed at a certain distance around the composite mineral particles.

Figure 3:
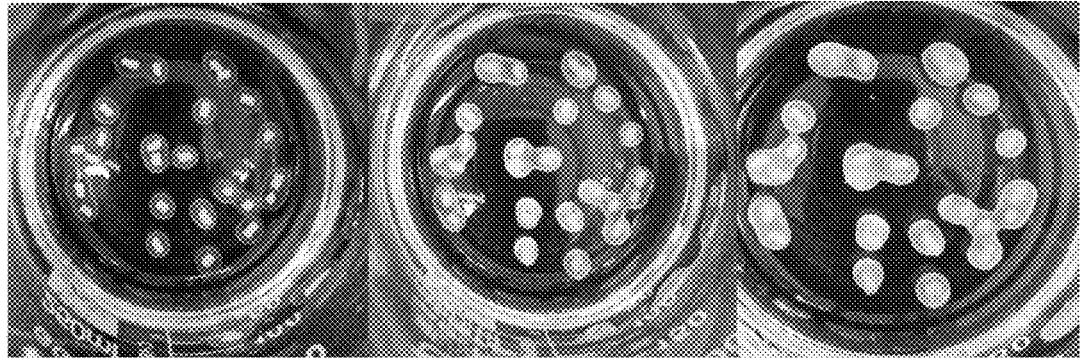
FIG. 3 is an effect diagram that shows the spontaneous formation of a colloidal liquid membrane by the composite mineral particles obtained in example 1 of the present invention and the membrane-forming mineralization of heavy metal $Cu^{2+}$.
Figure 4:
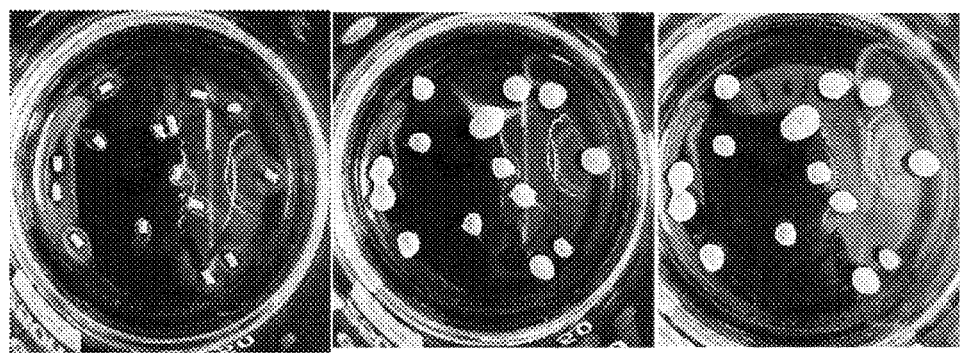
FIG. 4 is an effect diagram that shows the spontaneous formation of a colloidal liquid membrane by the composite mineral particles obtained in example 2 of the present invention and the membrane-forming mineralization of heavy metal $Zn^{2+}$.

FIG. 3 is an effect diagram shows the spontaneous formation of a colloidal liquid membrane by the composite mineral particles obtained in example 1 of the present invention and the membrane-forming mineralization of heavy metal $Cu^{2+}$, FIG. 4 is an effect diagram shows the spontaneous formation of a colloidal liquid membrane by the composite mineral particles obtained in example 2 of the present invention and the membrane-forming mineralization of heavy metal $Zn^{2+}$; it can be seen from the effect diagrams of forming colloidal liquid membrane and the membrane-forming mineralization of heavy metals $Cu^{2+}$ and $Zn^{2+}$ in FIG. 3 and FIG. 4 that the prepared composite mineral particles can form a colloidal liquid membrane in heavy metal acidic wastewater, and according to FIG. 3 and FIG. 4, it can be clearly seen that the membrane-forming mineralization of the colloidal liquid membrane fixes $Cu^{2+}$ and $Zn^{2+}$.

Figure 5:
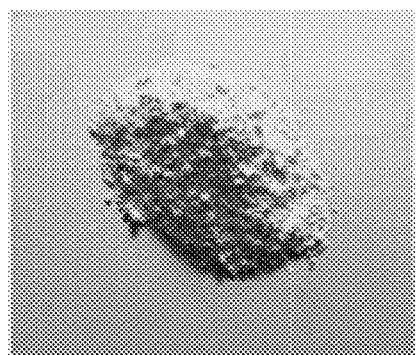
FIG. 5 is a photograph of the raw material bentonite of the present invention.
Figure 6:
FIG. 6 is a photograph of the raw material carbide slag of the present invention.
Figure 7:
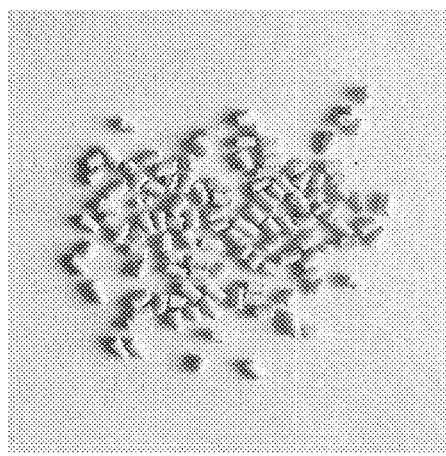
FIG. 7 is a photograph of the composite mineral particles prepared by example 3 of the present invention.
Figure 8:
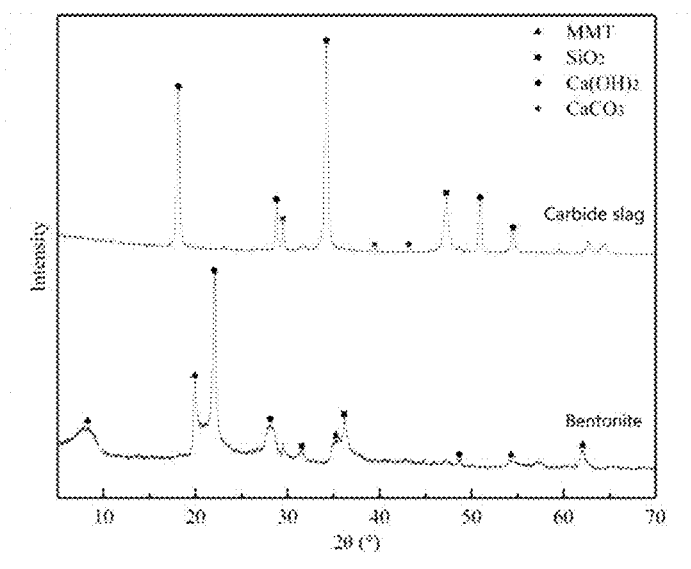
FIG. 8 is an X-ray diffraction (XRD) diagram of raw material bentonite and carbide slag.

FIG. 5 is a photograph of the raw material bentonite of the present invention, FIG. 6 is a photograph of the raw material carbide slag of the present invention, FIG. 7 is a photograph of the composite mineral particles prepared by example 3 of the present invention, FIG. 8 is an XRD diagram of raw material bentonite and carbide slag, it can be seen that bentonite and carbide slag are fine powder particles from FIG. 5 and FIG. 6, it can be seen that bentonite and carbide slag have less impurities from FIG. 8, it can be seen that the prepared composite mineral particles are uniform in size and are not easy to loosen from FIG. 7.

FIG. 9 is a schematic diagram of the device for the separation and recovery of heavy metal ions by membrane-forming mineralization fixation of the present invention, it can be seen that the device for the separation and recovery of heavy metal ions by membrane-forming mineralization fixation comprises the lower plate, the upper plate and the vertical cardboard that fixes the lower plate and the upper plate.

Figure 10:
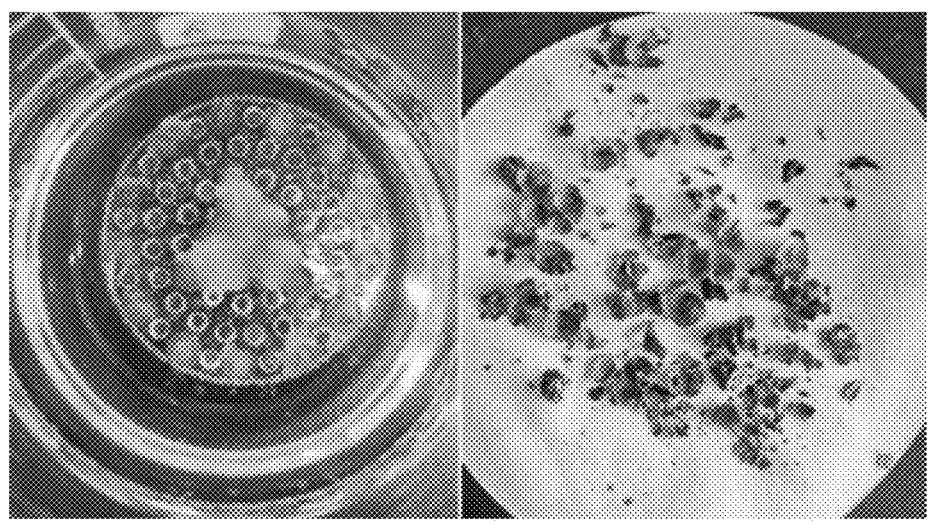
FIG. 10 is an effect diagram of the mineralized membrane formed by the composite mineral particles after treating the acid wastewater containing heavy metal $Cu^{2+}$ obtained in example 3 of the present invention.
Figure 11:
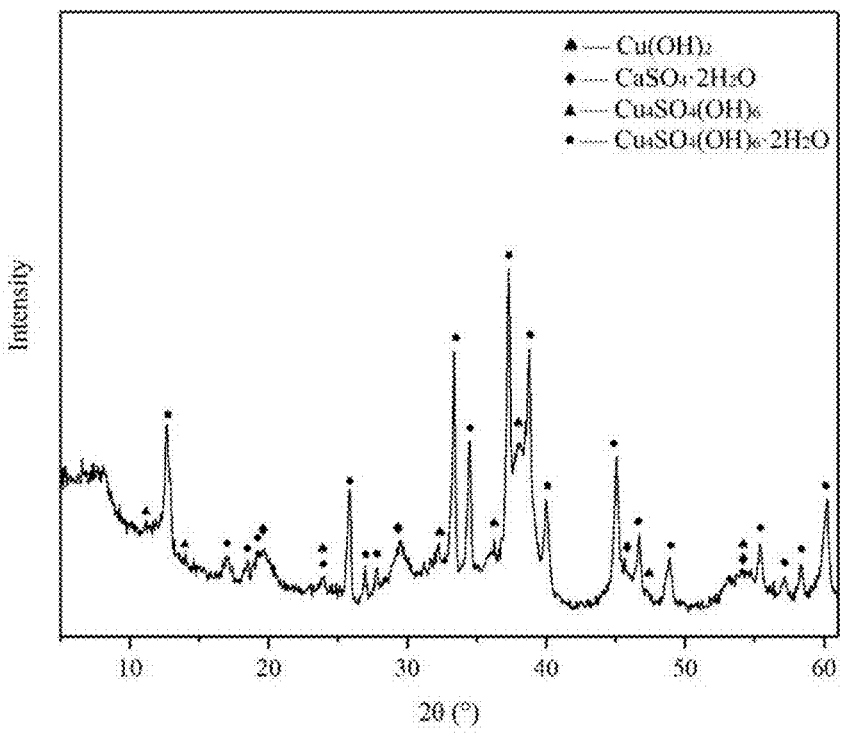
FIG. 11 is an XRD diagram of the mineralized membrane formed by the composite mineral particles after treating the acid wastewater containing heavy metal $Cu^{2+}$ obtained in example 3 of the present invention.
Figure 12:
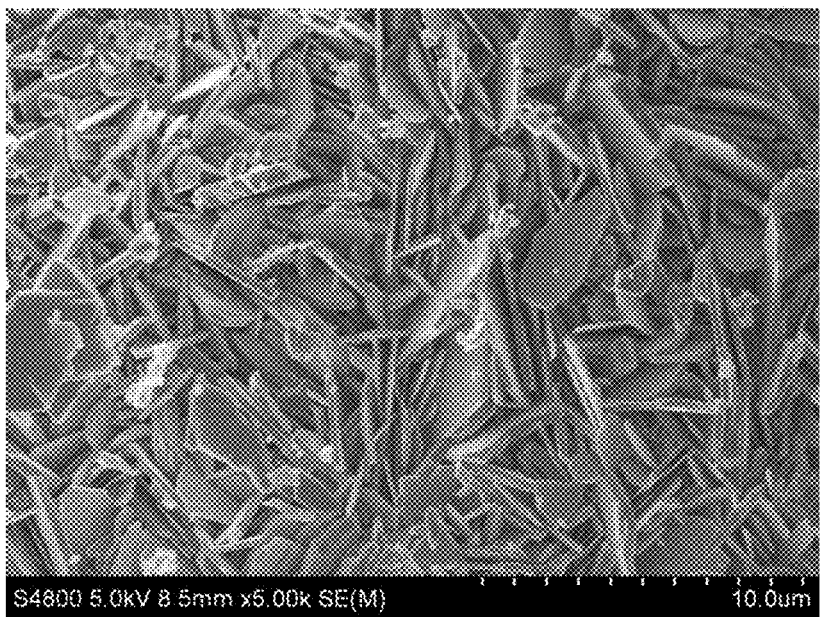
FIG. 12 is an scanning electron microscopy (SEM) photograph of the mineralized membrane formed by the composite mineral particles after treating the acid wastewater containing heavy metal $Cu^{2+}$ obtained in example 3 of the present invention.
Figure 13:
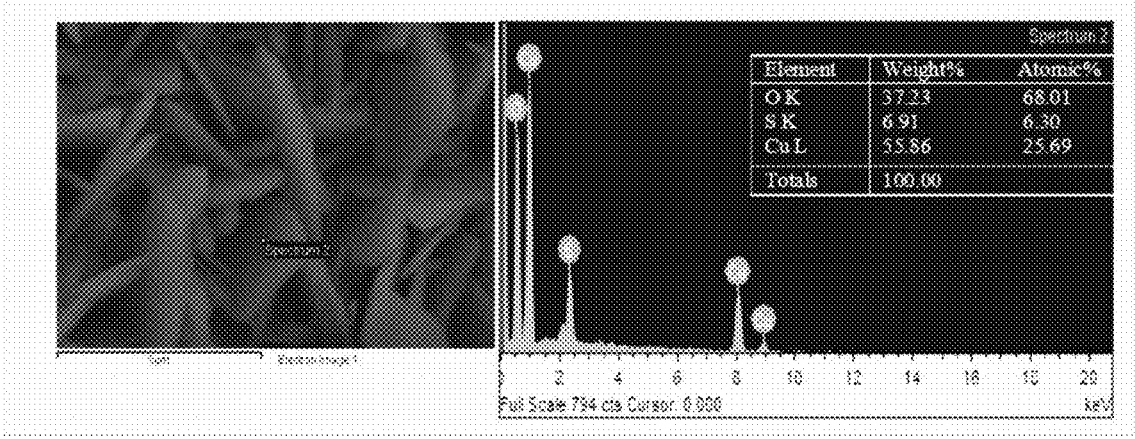
FIG. 13 is an energy dispersive X-ray spectroscopy (EDS) diagram of the mineralized membrane formed by the composite mineral particles after treating the acid wastewater containing heavy metal $Cu^{2+}$ obtained in example 3 of the present invention.

FIG. 10 is an effect diagram of the mineralized membrane formed by the composite mineral particles after treating the acid wastewater containing heavy metal $Cu^{2+}$ obtained in example 3 of the present invention, FIG. 11 is an XRD diagram of the mineralized membrane formed by the composite mineral particles after treating the acid wastewater containing heavy metal $Cu^{2+}$ obtained in example 3 of the present invention, FIG. 12 is an SEM photograph of the mineralized membrane formed by the composite mineral particles after treating the acid wastewater containing heavy metal $Cu^{2+}$ obtained in example 3 of the present invention, FIG. 13 is an EDS diagram of the mineralized membrane formed by the composite mineral particles after treating the acid wastewater containing heavy metal $Cu^{2+}$ obtained in example 3 of the present invention, it can be seen from FIGS. 10-13 that the final formed around the composite mineral particles is the mineralized membrane, and the mineralized membrane is mainly the plate-like basic copper sulfate crystal ($Cu_4SO_4(OH)_6·2H_2O$) minerals, containing heavy metal copper element purity of 55.86%, more than 50%, and heavy metal basic sulfate crystals ($Cu_4SO_4$ $(OH)_6·2H_2O$) mineral crystal phase purity can reach more than 90%.

Figure 14:
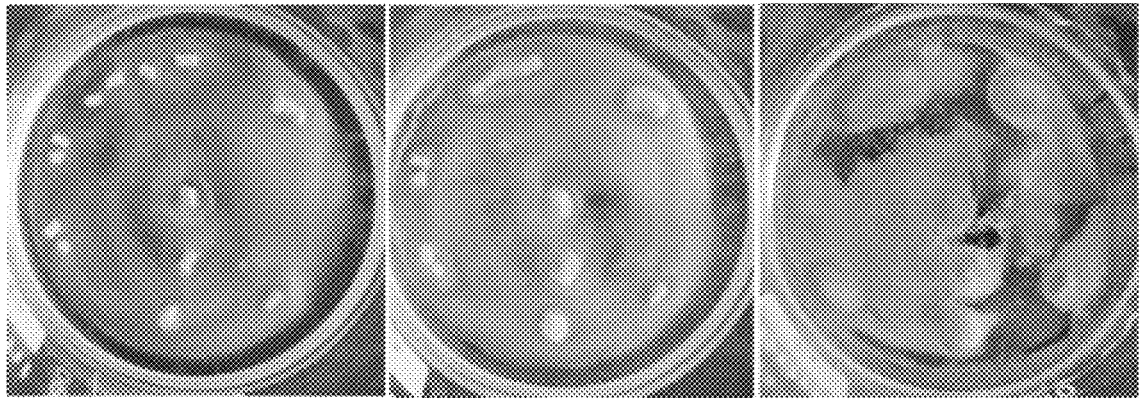
FIG. 14 is an effect diagram of the composite mineral particles prepared by the comparative example 2 on the treating of wastewater containing $Cu^{2+}$.

FIG. 14 is an effect diagram of the composite mineral particles prepared by the comparative example 2 on the treating of wastewater containing $Cu^{2+}$, it can be seen that the composite mineral particles prepared by the comparative example 2 can not form a mineralized membrane, but only generate $Cu(OH)_2$ precipitation in the water sample around the particles from FIG. 14.

The present invention provides a method for the separation and recovery of heavy metal ions by membrane-forming mineralization fixation for treating acidic wastewater with initial pH value of 2-6 and heavy metal ion concentration of 50-500 mg/L, the pH of the effluent reaches 6-9, and the removal rate of heavy metals reaches 95-100%, which can reach the discharge standard, the recovery amount of the mineralized membrane reaches 200-2000 mg/g, the purity of the heavy metals in the mineralized membrane reaches more than 50%, and the crystal purity of the mineralized membrane reaches more than 90%, the valuable metal membrane-forming mineralization fixation recovery effect is good, and can realize the resource utilization of industrial solid waste carbide slag, changing waste into valuables, waste control by waste, simultaneous treatment of wastewater and waste slag, mineralization fixation recovery of valuable metal resources in wastewater and circular economy.

The above examples are merely preferred examples of the present invention, it should be pointed out that for ordinary technicians in this technical field, some improvements and embellishments can be made without breaking away from the principle of the present invention, these improvements and embellishments should also be regarded as the protection scope of the present invention.

What is claimed is:

1. A film mineralization fixed separation and recovery method for heavy metal ions, including the following steps:
    mixing composite mineral particles with heavy metal acidic wastewater, and carrying out a first hydration reaction under static conditions to form a negatively charged colloidal liquid film rich in $Ca(OH)_2$, using the colloidal liquid film to adsorb, precipitate and crystallize heavy metal ions in the heavy metal acidic wastewater to obtain particles with an outer mineralized film, the particles with the outer mineralized film have a spacing between the mineralized film- and the particles;
    separating the particles with an outer mineralized film to obtain a mineralized film and particles, and then recovering the film and particles separately; and
    a preparation method of composite mineral particles includes the following steps:
        mixing at least one of sodium carbonate/sodium silicate with bentonite, carbide slag and water, and carrying out a second hydration reaction, obtaining the composite mineral particles after granulation, aging and dehydration condensation; particle sizes of bentonite and carbide slag are independently ≤74 μm; bentonite and carbide slag are dried before use;
        drying the bentonite and the carbide slag at 100-110° C. for 2-4 h;
    wherein mixing at least one of the sodium carbonate/sodium silicate with the bentonite, carbide slag and water comprises first, mixing the sodium carbonate/sodium silicate, bentonite and carbide slag evenly obtain a mixture, followed by adding water to the mixture with mixing;
    the particle size of the product obtained by granulation is 2-7 mm.

2. The method according to claim 1, wherein a dosage ratio of the composite mineral particles to the heavy metal acidic wastewater is 0.1-2.5 g:1 L.

3. The method according to claim 1, wherein a mass ratio of bentonite to carbide slag is (15.5-57.5):(40-80);

a mass of sodium carbonate/sodium silicate accounts for 2.5-4.5 wt % of a total mass of sodium carbonate/sodium silicate, bentonite and carbide slag.

4. The method according to claim 1, wherein a chemical composition of the bentonite includes: $SiO_2$:65-80%, $Al_2O_3$: 11-17%, $Na_2O$:0-6.0%, CaO:2.0-3.5%, MgO:2.0-5.0%, $Fe_2O_3$:1.6-4.0%, $TiO_2$:0.04-0.20%, $K_2O$:0.1-1.2% and other impurities: 0.10-2.16%; a chemical composition of the carbide slag includes CaO: 86.7-94.5%, $SiO_2$:2.0-6.5%, $Al_2O_3$: 0.5-3.0%, $Na_2O$:0.5-2.5%, $Fe_2O_3$:0.2-1.5%, MgO:0.10-0.22%, $TiO_2$:0.01-0.08% and other impurities: 1.0-1.72%.

5. The method according to claim 1, wherein a total mass ratio of the sodium carbonate/sodium silicate, bentonite and carbide slag to water is 1:(0.5-0.9).

6. The method according to claim 1, wherein an aging temperature is 10-35° C. and an aging time is 2-12 h.

7. The method according to claim 1, wherein the dehydration condensation comprises drying for 24-48 h under natural conditions; or a temperature of the dehydration condensation is 150-450° C., and a time of the dehydration condensation is 0.6-1.5 h.

8. The method according to claim 1, wherein the mineralized film is recovered as a raw material or finished product, and the particles are recovered as adsorbents.

9. The method according claim 1, wherein the separating comprises a film mineralization fixed separation and recovery device for heavy metal ions, including lower layer plates and upper layer plates arranged in sequence;

the upper layer plates are provided with through holes.

\* \* \* \* \*